United States Patent
Dickinger et al.

(10) Patent No.: US 9,506,550 B2
(45) Date of Patent: Nov. 29, 2016

(54) GEAR FOR A SPUR GEAR STAGE WITHOUT PLAY

(75) Inventors: Karl Dickinger, Vorchdorf (AT); Anton Kokoska, Zazriva (SK); Alexander Mueller, Altmuenster (AT)

(73) Assignee: Miba Sinter Austria GmbH, Laakirchen (AT)

( * ) Notice: Subject to any disclaimer, the term of this patent is extended or adjusted under 35 U.S.C. 154(b) by 93 days.

(21) Appl. No.: 14/342,596

(22) PCT Filed: Sep. 7, 2012

(86) PCT No.: PCT/AT2012/050134
§ 371 (c)(1),
(2), (4) Date: Mar. 4, 2014

(87) PCT Pub. No.: WO2013/078489
PCT Pub. Date: Jun. 6, 2013

(65) Prior Publication Data
US 2014/0216190 A1 Aug. 7, 2014

(30) Foreign Application Priority Data
Dec. 2, 2011 (AT) .............................. A 50001/2011

(51) Int. Cl.
*F16H 55/18* (2006.01)
*F16H 55/14* (2006.01)

(52) U.S. Cl.
CPC .............. *F16H 55/14* (2013.01); *F16H 55/18* (2013.01); *F16H 2055/185* (2013.01); *Y10T 74/19623* (2015.01)

(58) Field of Classification Search
CPC .. F16H 55/14; F16H 55/18; F16H 2055/185; F16H 2057/127
USPC .................................................. 74/409, 440
See application file for complete search history.

(56) References Cited

U.S. PATENT DOCUMENTS

| 5,979,259 A * | 11/1999 | Shook ..................... F16H 55/18 123/90.31 |
| 7,752,937 B1 | 7/2010 | Dornan |
| 2008/0141811 A1 | 6/2008 | Sandner |

FOREIGN PATENT DOCUMENTS

| DE | 10 2009 015947 A1 | 10/2010 |
| EP | 1 728 010 B1 | 12/2006 |
| WO | 2008/142131 A1 | 11/2008 |

OTHER PUBLICATIONS

International Search Report of PCT/AT2012/050134, mailed Nov. 8, 2012.

*Primary Examiner* — William Kelleher
*Assistant Examiner* — Gregory Prather
(74) *Attorney, Agent, or Firm* — Collard & Roe, P.C.

(57) ABSTRACT

A gear is described for a spur gear stage without play having a hub (1) and a sprocket (2), which is divided along its axis-normal division plane into two partial sprockets, namely into a hub-fixed sprocket part (3) and a sprocket ring (4) which is mounted so it is coaxially rotatable in relation thereto, and which forms springs (6) sectionally enclosing the hub (1) in the circumferential direction, which are integrally connected at their bases (11) to the sprocket ring (4) and which are supported with their free ends (7) protruding toward the hub (1) on stops (8) of the hub (1). To ensure advantageous spring loads, it is proposed that the sprocket ring (4), which is mounted so it is rotatable on the hub (1), form at least three springs (6), which are arranged rotationally-symmetrically with respect to the sprocket axis, and the stops (8) of the hub (1), which are also arranged rotationally-symmetrically, have approach surfaces (10) for the free ends (7) of the springs (6), which rise radially outward in the circumferential direction toward the bases (11) of the associated springs (6).

3 Claims, 2 Drawing Sheets

US 9,506,550 B2

GEAR FOR A SPUR GEAR STAGE WITHOUT PLAY

CROSS REFERENCE TO RELATED APPLICATIONS

This application is the National Stage of PCT/AT2012/050134 filed on Sep. 7, 2012, which claims priority under 35 U.S.C. §119 of Austrian Application No. A 50001/2011 filed on Dec. 2, 2011, the disclosure of which is incorporated by reference. The international application under POT article 21(2) was not published in English.

FIELD OF THE INVENTION

The invention relates to a gear for a spur gear stage without play, having a hub and a sprocket, which is divided along an axis-normal division plane into two partial sprockets, namely into a hub-fixed sprocket part and a sprocket ring mounted so it is coaxially rotatable in relation thereto, which forms springs sectionally enclosing the hub in the circumferential direction, which are integrally connected to the sprocket ring with their bases and are supported at their free ends, which protrude toward the hub, on stops of the hub.

DESCRIPTION OF THE PRIOR ART

To obtain a spur gear stage without play for transmitting alternating torques, the use of gears having a sprocket divided along an axis-normal division plane is known, wherein the two partial sprockets, namely a hub-fixed sprocket part and a sprocket ring coaxially rotatable in relation to the sprocket part, are spring-tensioned in relation to one another, so that upon the engagement of such a divided sprocket in a counter wheel, the two partial sprockets press elastically on the opposing tooth flanks of the counter wheel without play. To achieve the mutual spring tensioning of the two sprocket parts, a ring spring which encloses the hub of the sprocket can be used (EP 1 728 010 B1), which is supported with its ends in each case on a stop of the hub-fixed sprocket part and of the sprocket ring under a corresponding pre-tension. However, the ring spring represents a separate structural part.

To avoid the expenditure linked to such a separate ring spring, allocating the ring spring onto multiple springs, which each extend over a circumference section, and implementing these springs integrally with the sprocket ring has already been proposed (WO 2008/142131 A1), so that the free ends of the springs of the sprocket ring, which is mounted so it is rotatable inside an indented ring shoulder of the hub-fixed sprocket part, must only be supported on a stop of the hub-fixed sprocket part. However, it has been shown that the loads occurring of the springs, which act as bending springs clamped on one side, can result in a local overload of the springs, in particular in the case of a comparatively small wall thickness of the ring disk body used for the sprocket ring.

SUMMARY OF THE INVENTION

The invention is therefore based on the object of designing a gear of the type described at the beginning such that the risk of local overload of the springs can be substantially precluded.

Proceeding from a gear for a spur gear stage without play, the invention achieves the stated object in that the sprocket ring, which is mounted so it is rotatable on the hub, forms at least three springs arranged rotationally-symmetrically with respect to the sprocket axis, and the stops of the hub, which are also arranged rotationally-symmetrically, have approach surfaces, which rise radially outward in the circumferential direction toward the bases of the associated springs, for the free ends of the springs.

By providing an appropriately inclined approach surface for the free end of the springs, which are implemented integrally with the sprocket ring, an additional degree of freedom is obtained for the displacement of the springs during the engagement of a counter wheel in the sprocket of the gear, so that a load equalization, which prevents a local overload of the springs can occur. In addition, the spring deflection is enlarged with a displacement of the spring ends along their approach surfaces, which opens up the possibility of using softer springs and therefore counteracting a local overload of the springs. In addition, the radial component of the spring forces caused by the inclined approach surfaces causes centering of the sprocket ring in relation to the hub-fixed sprocket part of the sprocket.

Although the structural embodiment of the stops having the approach surfaces for the free ends of the springs can turn out differently, particularly simple structural conditions result if axial grooves, which form the stops for the free ends of the springs, are provided distributed over the outer circumference of the hub. This means that at least one of the groove walls must extend inclined in the circumferential direction in relation to a diameter plane to form the approach surface. The arrangement of axial grooves on the outer circumference of the hub of the gear additionally represents an advantageous condition for axially securing the sprocket ring. For this purpose, the hub can protrude axially beyond the sprocket ring, so that at least the groove wall of the axial grooves which adjoins the approach surface can extend inclined away from the respective spring. As a result of such a profile of the axial grooves, the force exerted on the free end of the springs by the inclined groove wall adjoining the approach surface causes an axial force component oriented toward the hub-fixed sprocket part, which presses the sprocket ring via its springs against the hub-fixed sprocket part of the sprocket and, in the event of lifting loads, leads back toward the hub-fixed sprocket part.

BRIEF DESCRIPTION OF THE DRAWING

The object of the invention is shown as an example in the drawing. In the figures

DESCRIPTION OF THE PREFERRED EMBODIMENT

Figure 1:
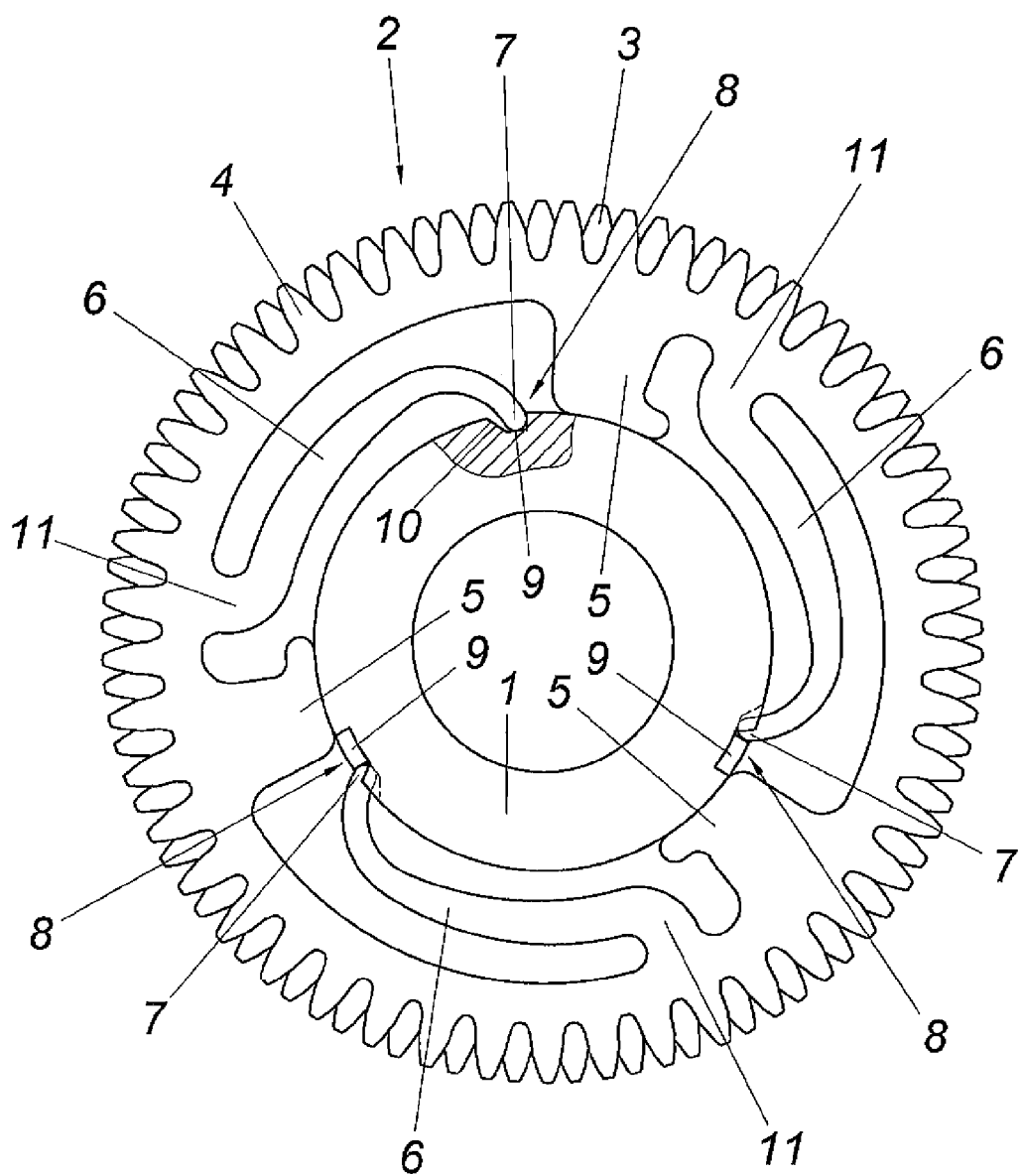
FIG. 1 shows a gear according to the invention for a spur gear stage without play in a partially cutaway view from the side having the sprocket ring.
Figure 3:
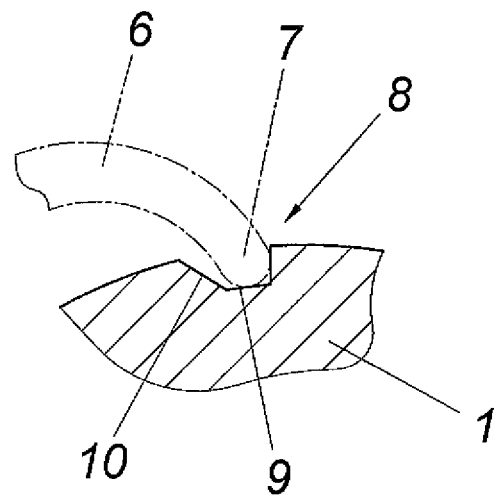
FIG. 3 shows the hub-side stop for the free end of a spring of the sprocket ring in a section along line III-III of FIG. 2 in an enlarged scale.
Figure 4:
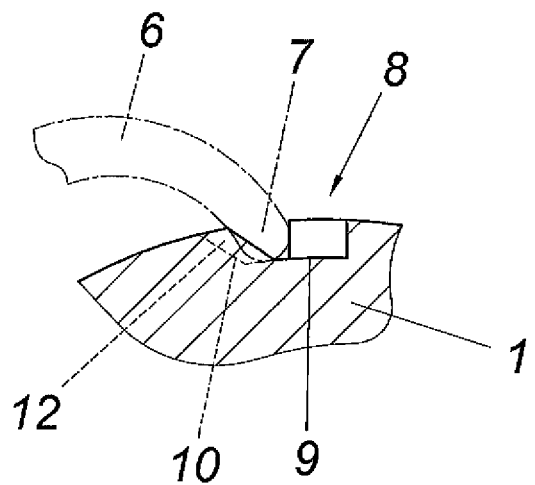
FIG. 4 shows a detail corresponding to FIG. 3 of the hub in a section along line IV-IV of FIG. 2.

The gear for a spur gear stage without play has, according to the illustrated exemplary embodiment, a hub 1 and a sprocket 2, which is composed of a hub-fixed sprocket part 3 and a sprocket ring 4, which is mounted so it is rotatable on the hub 1 via bearing attachments 5. As can be inferred from FIG. 1, springs 6, which extend over a circumferential section of the hub 1, and which are arranged rotationally-symmetrically with respect to the sprocket axis, are integrally formed on the sprocket ring 4, which is in the form of a ring disk. The free ends 7 of these springs 6 protrude toward the hub 1 and are supported on stops 8, which are formed by axial grooves 9 on the outer circumference of the hub 1. These stops 8, which are also arranged rotationally-symmetrically with respect to the sprocket axis, respectively form an approach surface 10 for the free ends 7 of the springs 6, as can be inferred in particular from FIGS. 3 and 4. The approach surfaces 10, which are formed by a wall of the axial grooves 9, rise radially outward toward the roots 11 (FIG. 1) of the springs 6, so that in the event of a mutual twist of the sprocket ring 4 in relation to the hub-fixed sprocket part 3, the free ends 7 of the springs 6 run on the approach surfaces 10 and therefore the displacement resistance increases accordingly, because the springs 6 must additionally be tensioned. The radial displacement of the free spring ends 7 caused by the approach surfaces 10 allows a spring characteristic curve which is advantageous for the spring load, without impairing the spring application of the sprocket ring 4 in relation to the hub-fixed sprocket part 3.

Figure 2:
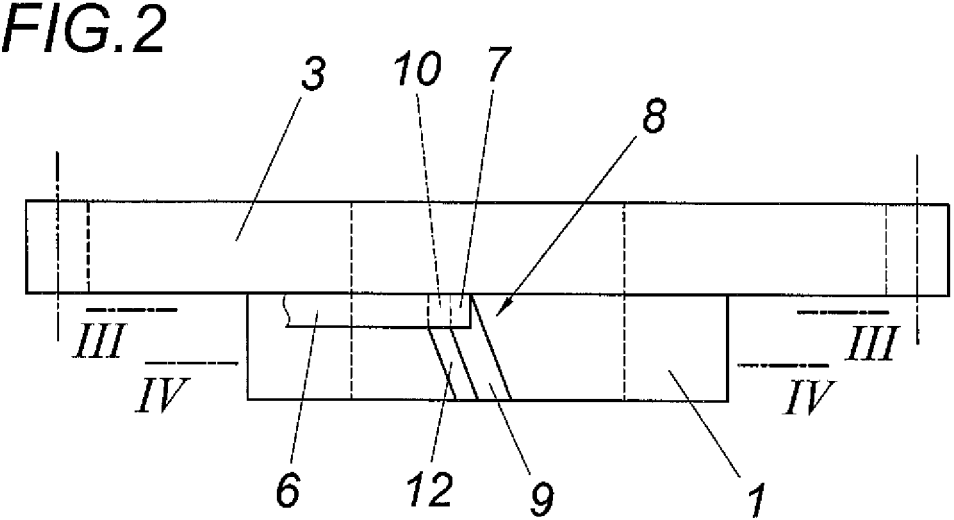
FIG. 2 shows this gear in a top view perpendicular to the gear axis without sprocket ring.

According to FIG. 2, the axial grooves 9 extend inclined away from the respective spring 6, wherein as a result of the inclination of the groove wall 12 adjoining the approach surface 10, an axial force component can be exerted on the free end 7 of the springs 6 in the direction toward the hub-fixed sprocket part 3, when the free end 7 of the springs 6 runs on this inclined groove wall 12. This means the sprocket ring 4 is returned when, as a result of a corresponding load, the tendency exists that the sprocket ring 4 lifts off of the hub-fixed sprocket part 3.

The invention claimed is:

1. A gear for a spur gear stage without play comprising:
   a hub and
   a sprocket, said sprocket being divided along its axis-normal division plane into a hub-fixed sprocket part and a sprocket ring,
   wherein said sprocket ring is mounted so it is coaxially rotatable in relation thereto, and said sprocket ring forms springs sectionally enclosing the hub in the circumferential direction in an unstressed state of the springs, said springs being integrally connected at their bases to the sprocket ring and supported with their free ends protruding toward the hub on stops of the hub, wherein the sprocket ring is mounted so it is rotatable on the hub and forms at least three springs arranged rotationally-symmetrically with respect to the sprocket axis, and the stops of the hub are arranged rotationally-symmetrically and have approach surfaces for the free ends of the springs, said springs rising radially outward in the circumferential direction toward the bases of the associated springs in an unstressed state of the springs.

2. The gear according to claim 1, wherein axial grooves are distributed over the outer circumference of the hub and form the stops for the free ends of the springs.

3. The gear according to claim 2, wherein the hub protrudes axially beyond the sprocket ring, and at least the groove wall of the axial grooves, and
   wherein the groove wall adjoins the approach surface and extends inclined away from the respective spring.

* * * * *